United States Patent [19]
Takeuchi

[11] Patent Number: 6,017,193
[45] Date of Patent: Jan. 25, 2000

[54] DISTRIBUTION PRESSURE CONTROL APPARATUS

[75] Inventor: Kenji Takeuchi, Tokyo, Japan

[73] Assignee: Kabushiki Kaisha Toshiba, Kawasaki, Japan

[21] Appl. No.: 09/150,617

[22] Filed: Sep. 10, 1998

[30] Foreign Application Priority Data

Sep. 11, 1997 [JP] Japan .................................. 9-246874

[51] Int. Cl.$^7$ .................................................. G05D 16/20
[52] U.S. Cl. ............................................................. 417/20
[58] Field of Search ................................................ 417/20

[56] References Cited

U.S. PATENT DOCUMENTS 5,775,367  7/1998  Yamaguchi et al. ............ 137/625.64 X

*Primary Examiner*—Gerald A. Michalsky
*Attorney, Agent, or Firm*—Finnegan, Henderson, Farabow, Garrett & Dunner, L.L.P.

[57] ABSTRACT

The present invention provides a distribution pressure controlling apparatus comprising section for supplying water in a distribution reservoir to a distributing pipe network, section for detecting an outlet pressure of water, section for detecting an outlet flow of water, section for detecting a distribution pressure of the distributing pipe network, a fuzzy table for storing a relationship between a deviation between a distribution pressure set by a user and the distribution pressure, the outlet flow, and an outlet pressure target value correction amount for correcting an outlet pressure of water, outputting section for obtaining the outlet pressure target value correction amount from the fuzzy table, based on the deviation between the distribution pressure set by the user and the distribution pressure, and the outlet flow, for correcting an outlet pressure target value with use of the outlet pressure target value correction amount, and for outputting the outlet pressure target value thus corrected; and section for controlling distributing section to be equalized to the distribution pressure set by the user, based on the outlet pressure target value and the outlet pressure.

8 Claims, 5 Drawing Sheets

OUTLET FLOW Q(t)

| DEVIATION OF DISTRIBUTING PRESSURE E(t) | PB | PS | Z | NS | NB |
|---|---|---|---|---|---|
| PB | PB (R1) | PB (R2) | PM (R3) | PM (R4) | PS (R5) |
| PS | PM (R6) | PM (R7) | PS (R8) | PS (R9) | Z (R10) |
| Z | Z (R11) | Z (R12) | Z (R13) | Z (R14) | Z (R15) |
| NS | NM (R16) | NM (R17) | NS (R18) | NS (R19) | Z (R20) |
| NB | NB (R21) | NB (R22) | NM (R23) | NM (R24) | NS (R25) |

FIG. 2

OUTLET FLOW RATE dQ(t)

| DEVIATION OF DISTRIBUTING PRESSURE E(t) | PB | PS | Z | NS | NB |
|---|---|---|---|---|---|
| PB | PB (R1) | PB (R2) | PM (R3) | PS (R4) | PS (R5) |
| PS | PM (R6) | PM (R7) | PS (R8) | PS (R9) | Z (R10) |
| Z | Z (R11) | Z (R12) | Z (R13) | Z (R14) | Z (R15) |
| NS | Z (R16) | NS (R17) | NS (R18) | NM (R19) | NM (R20) |
| NB | NS (R21) | NS (R22) | NM (R23) | NB (R24) | NB (R25) |

FIG. 3

| Distribution Pressure Deviation | Outlet Flow of Distributing Pumps | Outlet Flow Rate of Distributing Pumps | Output of First Fuzzy Table (Outlet Pressure Target Value) | Output of Second Fuzzy Table (Outlet Pressure Target Value) |
|---|---|---|---|---|
| PB — Distribution pressure is smaller than setting value | Outlet flow is very large | Outlet flow rapidly increases | Correction amount 1 | Correction amount 2 |
| PM | | | Correction amount should be very large in positive side | Correction amount should be very large in positive side |
| PS — Distribution pressure is relatively smaller than setting value | Outlet flow is relatively large | Outlet flow relatively increases | Correction amount should be considerably large in positive side | Correction amount should be considerably large in positive side |
| Z — Distribution pressure is equal to setting value | Outlet flow is averaged | Outlet flow does not change | Correction amount should be relatively large in positive side | Correction amount should be relatively large in positive side |
| NS — Distribution pressure is relatively larger than setting value | Outlet flow is relatively small | Outlet flow relatively increases | Correction amount should be zero | Correction amount should be zero |
| NM | | | Correction amount should be relatively small in negative side | Correction amount should be relatively small in negative side |
| NB — Distribution pressure is larger than setting value | Outlet flow is very small | Outlet flow rapidly increases | Correction amount should be considerably small in negative side | Correction amount should be considerably small in negative side |
| | | | Correction amount should be very small in negative side | Correction amount should be very small in negative side |

FIG. 4

DISTRIBUTION PRESSURE CONTROL APPARATUS

BACKGROUND OF THE INVENTION

The present invention relates to a distribution pressure controlling apparatus for controlling the distribution pressure in a distributing pipe network to obtain a constant distribution pressure.

Water from rivers is stored in a distributing reservoir through a water purification plant. Water thus stored is thereafter fed by a distributing pump and is supplied as service water to homes through distributing pipes embedded under roads near homes. Distributing pipes in a predetermined area are called a distributing pipe network, as a whole.

In order that service water can be used in homes, the pressure of service water should desirably be as constant as possible. Therefore, control must be performed so that the pressure or the distribution pressure in a distributing pipe network is constant. However, since the process gain in a distributing pipe network changes moment by moment in accordance with a demanded flow and the size of a change of the demand flow, it is difficult to control the distribution pressure to be constant.

An inference pressure control system and a PI pressure control system have been conventionally used as distribution pressure control systems as described above. In the inference pressure control system, a pressure loss Rf in a distributing pipe network is inferred and the distribution pressure P is obtained by a calculation of $P=P_0-Rf \cdot Q^{1.85}$ where the outlet pressure and the outlet flow of a distributing pump are respectively expressed as $P_0$ and Q. Thereafter, the rotation speed of a distributing pump is controlled to adjust the outlet pressure $P_0$.

Meanwhile, in the PI pressure control system, a calculation value is obtained by performing a proportional integral calculation based on a deviation between the distribution pressure $P_0$ measured by pressure meters provided at predetermined positions in a distributing pipe network and a distribution pressure set value, and the calculation value is taken as an outlet target value $P_0$. The rotation speed of a distributing pump is controlled such that the outlet pressure follows the outlet pressure target value $P_0$.

However, in the former inference pressure control system, a relatively large difference appears between an inferred pressure loss and an actual pressure loss, and it is therefore difficult to obtain a desired distribution pressure.

In the latter PI pressure control system, even when the demanded flow and the change rate of the demand flow is large or small, control parameters of the proportional integral calculation, such as a proportional gain and an integral time are constant. Therefore, if the control parameters are once set in compliance with a situation such as nighttime in which the demanded flow or the change rate of the demanded flow is small, sufficient control response cannot be obtained in response to a situation such as daytime in which the demanded flow or the change rate of the demand is large.

Inversely, if the control parameters are once set in compliance with a situation such as daytime in which the demanded flow or the change rate of the demand is large, hunting may occur in a situation such as nighttime in which the demanded flow or the change rate of the demand is small.

BRIEF SUMMARY OF THE INVENTION

The present invention has been made in view of the above situation and has an object of providing a distribution pressure controlling apparatus capable of controlling a distribution pressure to be constant regardless of changes of a demanded flow amount and a size of a change of a demanded flow amount.

To achieve the above object, according to a first aspect of the present invention, there is provided a distribution pressure controlling apparatus comprising: distributing means for supplying water in a distribution reservoir to a distributing pipe network; outlet pressure detecting means for detecting an outlet pressure of water discharged from the distributing means; outlet flow detecting means for detecting an outlet flow of water discharged from the distributing means; distribution pressure detecting means for detecting a distribution pressure of the distributing pipe network; a fuzzy table for storing a relationship between a deviation between a distribution pressure set by a user and the distribution pressure detected by the distribution pressure detecting means, the outlet flow detected by the outlet flow detecting means, and an outlet pressure target value correction amount for correcting an outlet pressure of water discharged from the distributing means; outputting means for obtaining the outlet pressure target value correction amount from the fuzzy table, based on the deviation between the distribution pressure set by the user and the distribution pressure detected by the distribution pressure detecting means, and the outlet flow detected by the outlet flow detecting means, for correcting an outlet pressure target value with respect to the distributing means with use of the outlet pressure target value correction amount, and for outputting the outlet pressure target value thus corrected; and controlling means for controlling the distributing means to be equalized to the distribution pressure set by the user, based on the outlet pressure target value outputted by the outputting means and the outlet pressure detected by the outlet pressure detecting means.

According to a second aspect of the present invention, there is provided an apparatus of the first aspect, wherein the distributing means consists of a plurality of distributing pumps, and the controlling means performs feedback control on a number of operating ones of the distributing pumps and a rotation speed thereof.

According to a third aspect of the present invention, there is provided a distribution pressure controlling apparatus comprising: distributing means for supplying water in a distribution reservoir to a distributing pipe network; outlet pressure detecting means for detecting an outlet pressure of water discharged from the distributing means; outlet flow detecting means for detecting an outlet flow of water discharged from the distributing means; distribution pressure detecting means for detecting a distribution pressure of the distributing pipe network; calculating means for calculating a change rate of the outlet flow, based on the outlet flow detected by the outlet flow detecting means; a fuzzy table for storing a relationship between a deviation between a distribution pressure set by a user and the distribution pressure detected by the distribution pressure detecting means, the change rate of the outlet flow calculated by the calculating means, and an outlet pressure target value correction amount for correcting an outlet pressure of water discharged from the distributing means; outputting means for obtaining the outlet pressure target value correction amount from the fuzzy table, based on the deviation between the distribution pressure set by the user and the distribution pressure detected by the distribution pressure detecting means, and the change rate of the outlet flow calculated by the calculating means, for correcting an outlet pressure target value with respect to the distributing means with use of the outlet pressure target value correction amount, and for outputting the outlet pressure target value thus corrected; and controlling means for controlling the distributing means to be equalized to the distribution pressure set by the user, based on the outlet pressure target value outputted by the outputting means and the outlet pressure detected by the outlet pressure detecting means.

According to a fourth aspect of the present invention, there is provided an apparatus of the third aspect, wherein the distributing means consists of a plurality of distributing pumps, and the controlling means performs feedback control on a number of operating ones of the distributing pumps and a rotation speed thereof.

According to a fifth aspect of the present invention, there is provided an apparatus of the third aspect, wherein the change rate of the outlet flow calculated by the calculating means is calculated by a self-regression calculation based on present and past outlet flows detected by the outlet flow detecting means.

According to a sixth aspect of the present invention, there is provided a distribution pressure controlling apparatus comprising: distributing means for supplying water in a distribution reservoir to a distributing pipe network; outlet pressure detecting means for detecting an outlet pressure of water discharged from the distributing means; outlet flow detecting means for detecting an outlet flow of water discharged from the distributing means; distribution pressure detecting means for detecting a distribution pressure of the distributing pipe network; calculating means for calculating a change rate of the outlet flow, based on the outlet flow detected by the outlet flow detecting means; a first fuzzy table for storing a relationship between a deviation between a distribution pressure set by a user and the distribution pressure detected by the distribution pressure detecting means, the outlet flow detected by the outlet flow detecting means, and a first outlet pressure target value correction amount for correcting an outlet pressure of water discharged from the distributing means; a second fuzzy table for storing a relationship between the deviation between the distribution pressure set by the user and the distribution pressure detected by the distribution pressure detecting means, the change rate of the outlet flow calculated by the calculating means, and a second outlet pressure target value correction amount for correcting an outlet pressure of water discharged from the distributing means; obtaining means for obtaining the first outlet pressure target value correction amount from the first fuzzy table, based on the deviation between the distribution pressure set by the user and the distribution pressure detected by the distribution pressure detecting means and the change rate of the outlet flow calculated by the calculating means, and for obtaining the outlet pressure target value correction amount from the fuzzy table, based on the deviation between the distribution pressure set by the user and the distribution pressure detected by the distribution pressure detecting means, and the change rate of the outlet flow calculated by the calculating means; adding means for adding the first and second outlet pressure target value correction amounts obtained by the obtaining means, to each other, to obtain a third outlet pressure target value correction amount; outputting means for correcting an outlet pressure target value with respect to the distributing means with use of the third outlet pressure target value correction amount obtained by the adding means, and for outputting the outlet pressure target value thus corrected; and controlling means for controlling the distributing means to be equalized to the distribution pressure set by the user, based on the outlet pressure target value outputted by the outputting means and the outlet pressure detected by the outlet pressure detecting means.

According to a seventh aspect of the present invention, there is provided an apparatus of the sixth aspect, wherein the distributing means consists of a plurality of distributing pumps, and the controlling means performs feedback control on a number of operating ones of the distributing pumps and a rotation speed thereof.

According to an eighth aspect of the present invention, there is provided an apparatus of the sixth aspect, wherein the change rate of the outlet flow calculated by the calculating means is calculated by a self-regression calculation based on present and past outlet flows detected by the outlet flow detecting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 2 shows a first fuzzy table according to the embodiment;

FIG. 3 shows a second fuzzy table according to the embodiment;

FIG. 4 is a table which expresses meanings of parameters shown in FIGS. 2 and 3;

DETAILED DESCRIPTION OF THE INVENTION

In the following, embodiments of the present invention will be explained with reference to the drawings.

Figure 1:
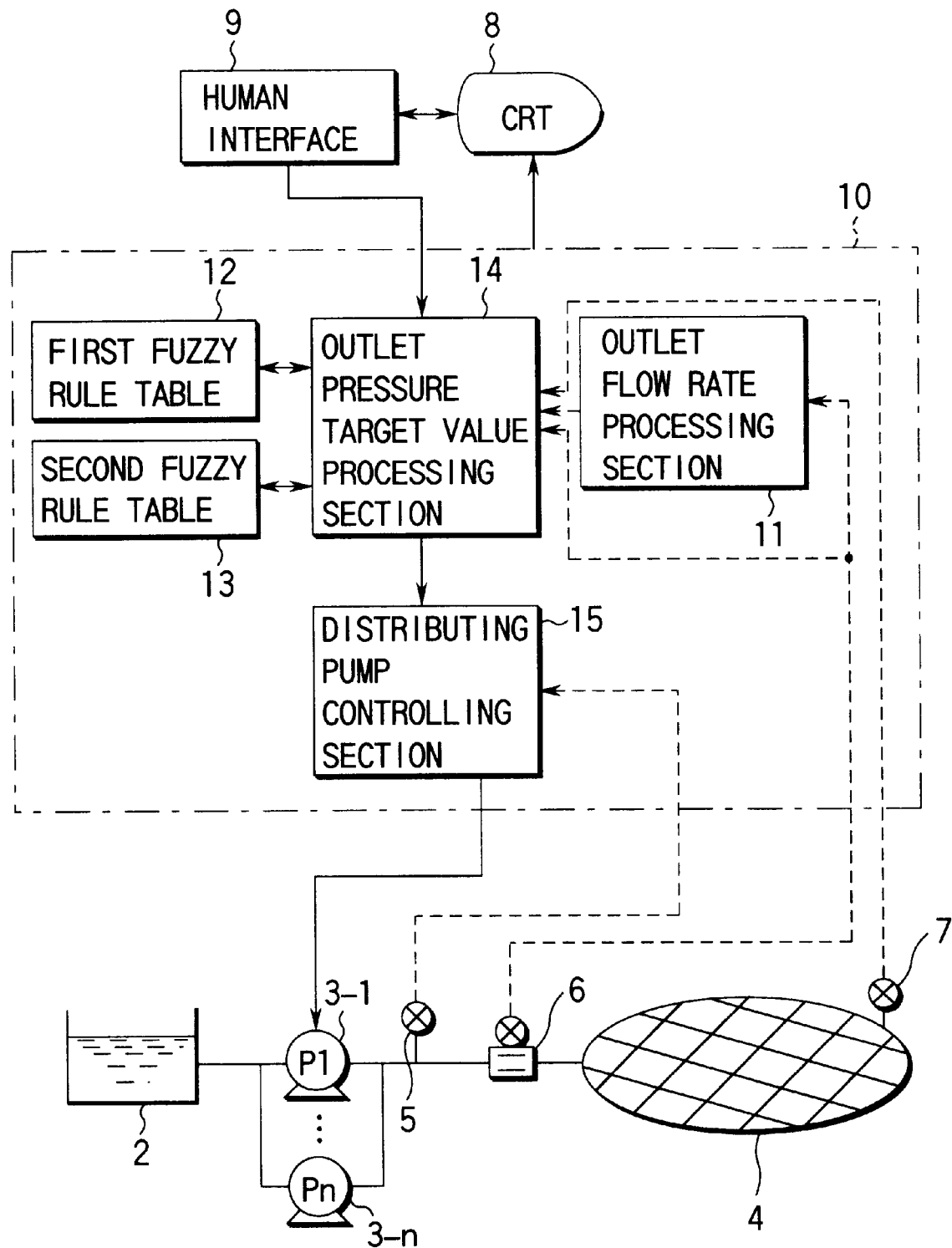
FIG. 1 is a diagram showing a distribution pressure control apparatus according to an embodiment of the present invention.

FIG. 1 shows a distribution pressure controlling apparatus according to an embodiment of the present invention.

As shown in the figure, the distribution pressure controlling apparatus has a water distribution system 1 and a calculation apparatus 10.

The water distribution system 1 is provided with a water reservoir 2 for temporarily storing water fed through a water purification plant and the like, and water stored in the water reservoir is distributed to a water distributing pipe network 4 by n pieces of distributing pumps 3-1, . . . , 3-n.

An outlet pressure meter 5 for detecting the outlet pressure of the water distributing pumps 3-1, . . . , 3-n and an output flow meter 6 for detecting the outlet flow are provided between the distributing pumps 3-1, . . . , 3-n and the water distributing pipe network.

A distribution water pressure meter 7 for detecting the distribution water pressure is provided at a predetermined position in the distributing pipe network 4. References 8 and 9 indicate respectively a display section with a touch panel and a human interface consisting of operation devices such as a keyboard, a mouse, and the like.

An operator inputs various data including an outlet pressure target value and the like through the human interface 9 with monitoring an operation state concerning measurement values from plant equipment devices and equipment devices, displayed on the display section 8. Meanwhile, the display section 8 displays measurement values of various equipment devices (such as an outlet pressure meter, an outlet flow meter, and the like) and other equipment devices taken in by the calculation apparatus 10.

The calculation device 10 is provided with an output flow rate processing section 11, a first fuzzy rule table 12, a second fuzzy table 13, an outlet pressure target value processing section 14, and a distributing pump control section 15.

The outlet flow rate processing section 11 takes in outlet flow measurement values measured by. the outlet flow meter 6 and obtains an outlet flow rate from a deviation between a preceding outlet flow measurement value and a present outlet flow measurement value thus taken in. The outlet flow rate may be obtained by a different calculation method.

For example, the outlet flow rate may be obtained by taking in and storing an outlet flow measurement value at a predetermined cycle and by a self-regression calculation based on a present outlet flow measurement value and a past outlet flow measurement value. By using the self-regression calculation, the outlet flow rate can be obtained with higher accuracy.

The first fuzzy table 12 defines a fuzzy rule which enables fuzzy inference, based on a deviation (or distribution pressure deviation) between a setting value of the distribution pressure of the distributing pipe network 4 and a distribution pressure measurement value, and the outlet flow of the flow meter 6, as shown in FIG. 2.

The second fuzzy rule table 13 defines a fuzzy rule which enables fuzzy inference, based on the distribution pressure deviation and the outlet flow rate, as shown in FIG. 3.

In the fuzzy table 12 shown in FIG. 2, PB in the columns of the outlet flow Q(t) means that "the outlet flow is very large", PS means that "the outlet flow is relatively large", Z means that "the outlet flow is an average", NS means that "the outlet flow is relatively small", and NB means that "the outlet flow is very small".

PB in the columns of the distributing pressure deviation E(t) means that "the pressure is smaller than a setting value", PS means that "the pressure is relatively smaller than a setting value", Z means that "the pressure is equal to a setting value", NS means that "the pressure is relatively larger than a setting value", and NB means that "the pressure is larger than a setting value". The parentheses "( )" in the table expresses table numbers.

In the fuzzy table 13 shown in FIG. 3, PB in the columns of the outlet flow rate dQ(t) means that "the outlet flow rapidly increases", PS means that "the outlet flow relatively increases", Z means that "the outlet flow does not change", NS means that "the outlet flow relatively decreases", and NB means that "the outlet flow rapidly decreases". In the columns of the distributing pressure deviation E(t), PB, PS, Z, NS, and BR have the same meanings as those in FIG. 2.

FIG. 4 is a table for explaining the meanings of the parameters indicated in FIGS. 2 and 3.

For example, the distributing pressure distribution E(t) corresponds to PB when the distributing pressure is smaller than a set value, and the outlet flow Q(t) from the distributing pump corresponds to PB when the outlet flow is very large. As a result, the PB (R1) fires in the first fuzzy table 12. The PB corresponds to such a correction which means that the outlet pressure target correction amount should be very large in the positive side.

Three calculation methods (1) to (3) described below will be used depending on which of an outlet flow measurement value measured by the outlet flow meter 6, an outlet flow rate calculated by the outlet flow rate processing section 11, and both of the outlet flow measurement value and the outlet flow rate are used by the outlet pressure target value processing section 14.

(1) A fuzzy inference value is obtained from the fuzzy rule defined in the first fuzzy rule table 12, based on the measurement value of the distributing pressure meter 7, the setting value of the distributing pressure, and the outlet flow measurement value of the outlet flow meter 6. Thereafter, an outlet pressure target value correction amount is obtained from the fuzzy inference value, and an outlet pressure target value corrected based on the correction amount is outputted.

(2) A fuzzy inference value is obtained from the fuzzy rule defined in the second fuzzy rule table 13, based on the measurement value of the distributing pressure meter 7, the setting value of the distributing pressure, and the outlet flow rate obtained from past and current outlet flow measurement values of the outlet flow meter 6. Thereafter, an outlet pressure target value correction amount is obtained from the fuzzy inference value, and an outlet pressure target value corrected based on the correction amount is outputted.

Where the fuzzy inference value is calculated not based on the outlet flow but based on the outlet flow rate, the demanded flow and the change rate of the demanded flow can be sensitively reflected rapidly on the fuzzy inference value and further on the outlet target value correction amount.

(3) An addition value (or sum) of the outlet pressure target values 1 and 2 respectively obtained by the above methods (1) and (2) is obtained as an outlet pressure target value correction amount. Thereafter, an outlet pressure target value corrected based on the correction amount is outputted.

The distributing pump controlling section 15 controls the number of operating distributing pumps 3-1 to 3-n and the rotation speed thereof, based on the outlet pressure detected by the outlet pressure target value and the outlet pressure meter 5 outputted from the outlet pressure target value processing section 14.

Next, explanation will be made of operation of the distribution pressure controlling apparatus according to the present embodiment. For the sake of convenience, the explanation will be made with respect to the method (3).

An operator (or user) sets a distribution pressure by a human interface 9. The outlet pressure target value processing section 14 executes fuzzy inference, based on a set distribution pressure, a distribution pressure measured by the distribution pressure meter 7, and an outlet flow measured by the outlet flow meter 6, thereby to calculate the outlet pressure target value of the distributing pumps 3-1 to 3-n.

In fuzzy inference, an outlet pressure target value correction amount is obtained based on an outlet flow, an outlet flow rate, and a distribution pressure deviation as data concerning the distribution pressure, and thereafter, the outlet pressure target value correction amount is added to a previous outlet pressure target value, to obtain a present outlet pressure target value which is outputted to the distributing pump controlling section 15.

The distributing pump controlling section 15 executes a PI control calculation and performs control of the number of operating distributing pumps and the rotation speed thereof in accordance with an outlet pressure operation signal obtained, to control the outlet pressure of the distributing pumps.

Next, explanation will be made of an example in which an outlet pressure target value correction amount is calculated by using fuzzy inference.

Targets as inputs to the fuzzy inference are a distribution pressure deviation between a distribution pressure setting value and a distribution pressure measurement value, an outlet flow and an outlet flow rate of a distributing pump. Here, the outlet flow rate is obtained by self-regression calculation by a Kalman filter or the like, based on a present outlet flow measurement value and a past outlet flow measurement amount, as described above.

Further, based on the input data described above for fuzzy inference, the outlet pressure target value correction amount is obtained by using fuzzy rules in two fuzzy rule tables 12 and 13 shown in FIGS. 2 and 3.

Specifically, in the outlet pressure target value processing section 14, a fuzzy inference calculation is executed by using the fuzzy rule defined in the first fuzzy rule table 12, based on a distribution pressure deviation and an outlet flow, to obtain an outlet pressure target value correction amount 1.

Likewise, a fuzzy inference calculation is executed by using the fuzzy rule defined in the second fuzzy rule table 13, based on a distribution pressure deviation and an outlet flow rate, to obtain an outlet pressure target value correction amount 2.

Figure 5:
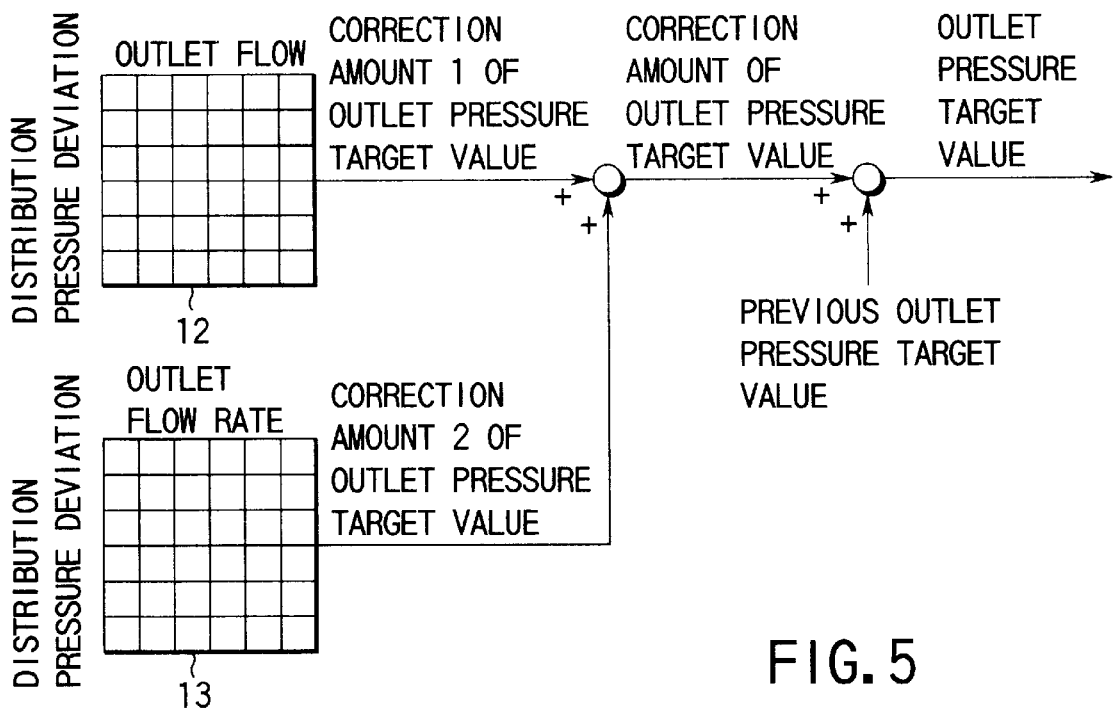
FIG. 5 is a view explaining operation of the outlet pressure target value processing section.

Next, as shown in FIG. 5, the outlet pressure target value correction amounts 1 and 2 are added to each other to calculate a final outlet pressure target value correction amount. The final outlet pressure target value correction amount thus calculated is added to a previous outlet pressure target value, and the addition result is outputted as a present outlet pressure target value to the distributing pump controlling section 15.

Next, explanation will be specifically made of an example of inferring an outlet flow target value correction amount from an outlet flow and a distribution pressure measurement value.

Figure 6:
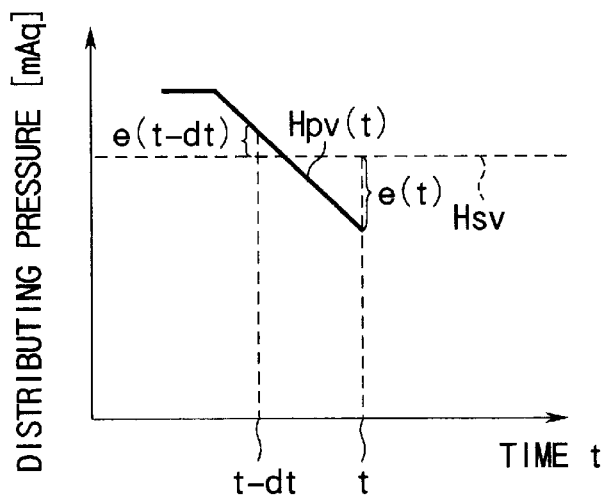
FIG. 6 is a graph explaining inference of an outlet flow target value correction amount.
Figure 7:
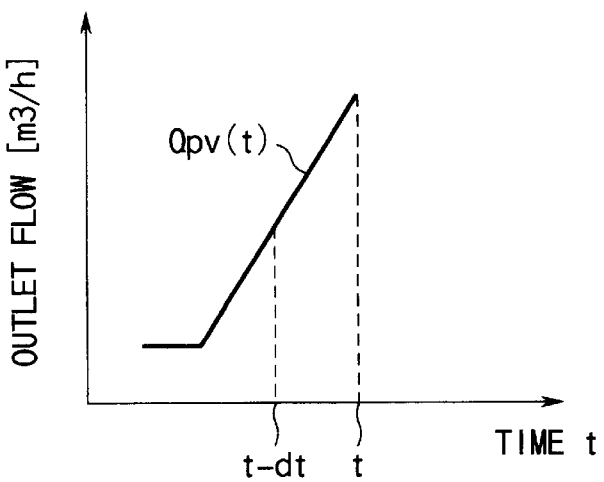
FIG. 7 is a graph explaining inference of an outlet flow target value correction amount.

It is now supposed that the distribution pressure measurement value Hpv(t) and the outlet flow Qtv(t) change as shown in FIGS. 6 and 7.

Specifically, the distribution pressure measurement value Hpv(t) gradually decreases to become smaller than the distribution pressure setting value Hsv at a time t at which the deviation is e(t). Meanwhile, the outlet flow Qpv(t) becomes very large since the demanded amount from homes is large.

Therefore, in the outlet pressure target value processing section 14, the rule (R1) fires from the fuzzy rule of the first fuzzy table 12 since the outlet flow Qpv(t) is very large and the distribution pressure measurement value Hpv(t) is smaller than the distribution pressure setting value Hsv. That is, a result that the outlet pressure target value correction amount 1 should be enlarged in the positive side is extracted from the first fuzzy rule table 12.

Meanwhile, the rule (R1) fires from the fuzzy rule of the section fuzzy rule table 13, since the outlet flow rate dQpv(t) rapidly increases and the distribution pressure measurement value Hpv(t) is smaller than the distribution pressure setting value Hsv. That is, a result that the outlet pressure target value correction amount 2 should be enlarged in the positive side is extracted from the second fuzzy rule table 13.

In case of actual inference, the distribution pressure deviation e(t), the outlet flow Qpv(t), and the outlet flow rate dQpv(t) as inputs in the fuzzy inference are values as normalized below.

$$e(t) = Hsv - Hpv(t) \qquad (1)$$

$$E(t) = e(t)/H\ e\ \max \qquad (2)$$

$$Qm = (Q\max + Q\min)/2 \qquad (3)$$

$$Qg = (Q\max - Q\min)/2 \qquad (4)$$

$$Q(t) = (Qpv(t) - Qm)/Qg \qquad (5)$$

$$dQ(t) = dQpv(t)/dQ\max \qquad (6)$$

In the above equations, e(t): Deviation between a distribution pressure setting value and a distribution pressure measurement value Hsv: Distribution pressure setting value p1 Hpv(t): Distribution pressure measurement value H e max: Distribution pressure deviation width Qmax: Maximum outlet flow Qmin: Minimum outlet flow Qm: Average between Qmax and Qmin Qg: Absolute value of a difference between Qmax and Qmin Qpv(t): Outlet flow measurement value dQpv(t): Outlet flow rate dQmax: Outlet flow rate width E(t): Value of a normalized distribution pressure deviation Q(t): Value of a normalized outlet flow dQ(t): Value of a normalized outlet flow rate t: Time Therefore, a correction amount for an outlet pressure target value is calculated by the distribution pressure deviation E(t), the outlet flow Q(t), and the outlet flow rate dQ(t).

Figure 8:
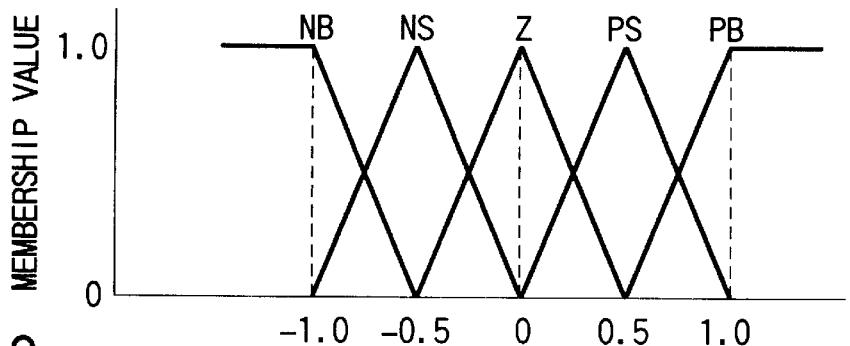
FIG. 8 is a graph showing a membership function defining a distribution pressure deviation, an outlet flow, and an outlet flow change rate (inputs)
Figure 9:
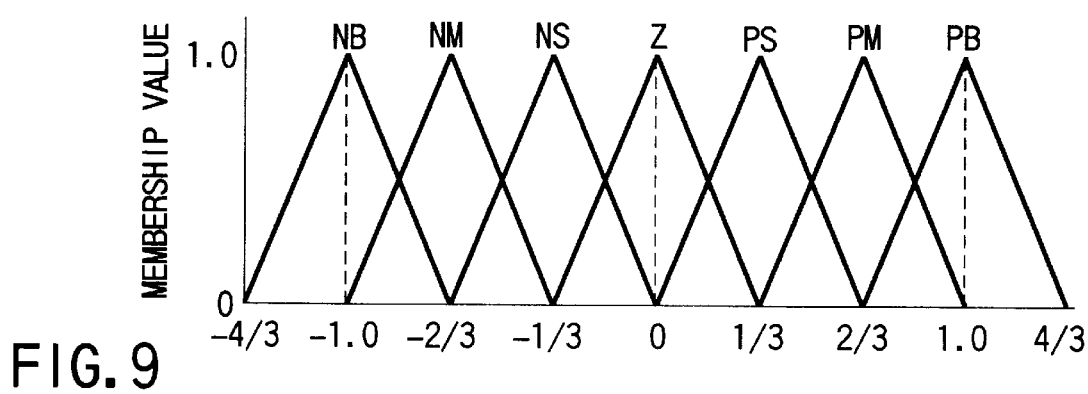
FIG. 9 is a graph showing a membership function defining a outlet pressure target value correction amount (output)

FIG. 8 is a graph showing functions which define the distribution pressure deviation, the outlet flow, and the outlet flow rate (input). FIG. 9 is a graph showing membership functions which define the outlet pressure target value correction amount (output).

Further, based on the fuzzy inference value obtained by the fuzzy inference as described above, the correction amount of the outlet pressure target value is obtained by the following equations.

$$hsv(t) = hsv(t - dt) + K1 \cdot dh1(t) + K2 \cdot dh2(t) \qquad (7)$$

$$dh1(t) = Hinf1 \cdot d\ h\ \max 1 \qquad (8)$$

$$dh2(t) = Hinf2 \cdot d\ h\ \max 2 \qquad (9)$$

In the above equations, hsv(t): Outlet pressure target value dh1(t): Outlet pressure target value correction amount 1 dh2(t): Outlet pressure target value correction amount 2 d h max1: Outlet pressure target value correction amount width 1 d h max2: Outlet pressure target value correction amount width 2

K1: Gain of outlet pressure target value correction amount 1

K2: Gain of outlet pressure target value correction amount 2 dt: Control cycle

Hinf1: Fuzzy inference value (Normalized value of outlet pressure target value correction amount 1)

Hinf2: Fuzzy inference value (Normalized value of outlet pressure target value correction amount 2)

If K1+K2=1 is satisfied in the above equations, K1 and K2 correspond to distribution coefficients. That is, if the gain K1=1 of the outlet pressure target value correction amount 1 and the gain K2=2 of the outlet pressure target value correction amount 2 are satisfied in the equation (7), the outlet pressure target value correction amount 1 obtained from the first fuzzy rule table 12 by fuzzy inference is the correction amount for the outlet pressure target value, and the correction amount for the outlet pressure target value can be obtained by using the fuzzy rule in the first fuzzy rule table 12.

Also, if the gain K1=0 of the outlet pressure target value correction amount 1 and the gain K2=1 of the outlet pressure target value correction amount 2 are satisfied, the outlet pressure target value correction amount 2 obtained from the second fuzzy rule table 13 by fuzzy inference is the correction amount for the outlet pressure target value, and the correction amount for the outlet pressure target value can be obtained by using the fuzzy rule in the second fuzzy rule table 13.

Figure 10:
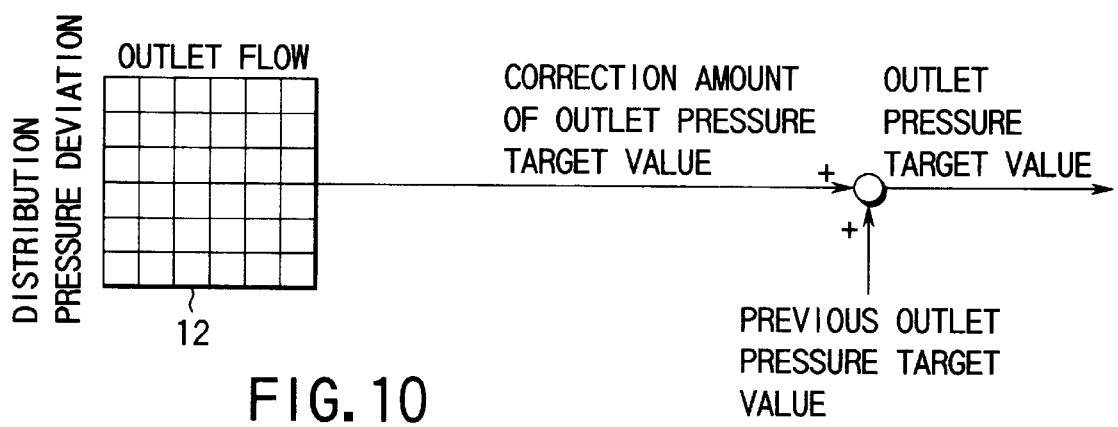
FIG. 10 is a view explaining operation of an outlet target value processing section where one fuzzy table is used.
Figure 11:
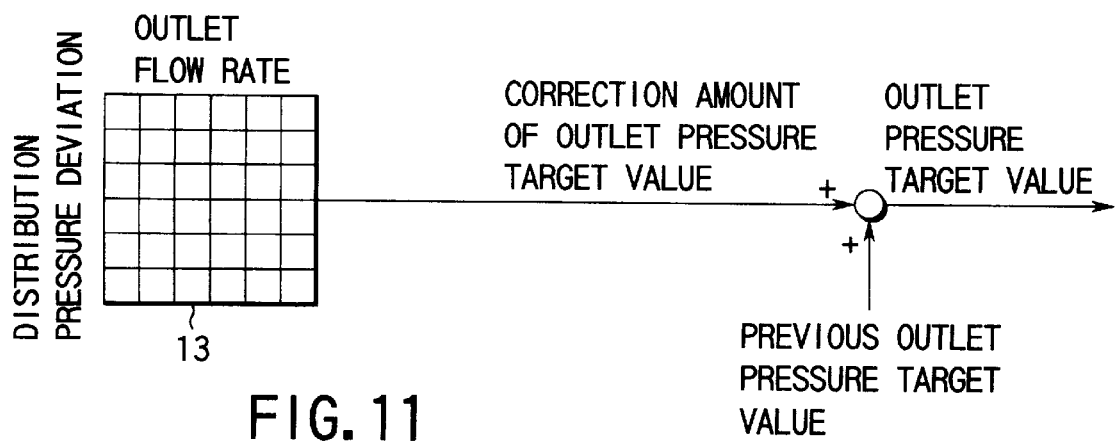
FIG. 11 is a view explaining operation of an outlet target value processing section where one fuzzy table is used.

Although the present embodiment has been explained with respect to a case of using two fuzzy rule tables, only one fuzzy rule table may be used as shown in FIGS. 10 and 11.

In this case, the outlet pressure target value correction amount obtained from the fuzzy rule tables 12 and 13 are set as a final outlet pressure target value correction amount from which an outlet pressure target value is obtained.

Therefore, according to the embodiment described above, fuzzy rules are defined in the fuzzy rule table 12 from the distribution pressure deviation of the distributing pipe network 4 and the outlet flow of the distributing pumps, and fuzzy inference values are obtained from the fuzzy rules when the distributing pressure deviation or the outlet flow of the distributing pumps.

Further, based on the fuzzy inference values, an outlet pressure target value correction amount is extracted by fuzzy inference and a previous. outlet pressure target value is corrected. Therefore, it is possible to obtain an outlet pressure target value correction amount in accordance with a pressure deviation or an outlet flow rate, corresponding to a size of demanded flow. The distribution pressure can be controlled to be constant, rapidly responding to the size of demanded flow.

In addition, by using the change rate of the outlet flow amount of distributing pumps in place of the outlet flow of the distributing pumps, fuzzy rules are defined, based on a distributing pressure deviation and a change rate of the outlet flow of the distributing pumps. Based on the distribution pressure deviation and the outlet flow rate, a fuzzy inference value is obtained from the fuzzy rules.

Further, an outlet pressure target value correction amount is extracted by fuzzy inference based on the fuzzy inference value. Therefore, change of a demanded flow size can be sensitively detected from the relationship between a past outlet flow and a present outlet flow, and can be reflected on an outlet pressure target value correction amount.

Further, by using a first fuzzy rule depending on a combination of a distribution pressure deviation and an outlet flow of distributing pumps and a second fuzzy rule depending on the distribution pressure deviation and a change rate of the outlet flow of distributing pumps, fuzzy inference values are respectively obtained from the first and second fuzzy rules, in accordance with the distribution pressure deviation, the outlet flow, and the change rate of the outlet flow.

Further, based on the fuzzy inference values, outlet pressure target value correction amounts are extracted by fuzzy inference, and the sum of the two outlet pressure target value correction amounts is used as the outlet pressure target value correction amount. Therefore, various changes including a demanded flow and a change of the demanded flow can be sensitively detected and can be reflected on the outlet pressure target value correction amount. The distribution pressure can thus be controlled to be constant.

As has been explained above, according to the present invention, an outlet pressure target value correction amount is obtained and an outlet pressure target value is corrected, based on fuzzy rules in which a distribution pressure deviation, an outlet flow, and an outlet flow rate are used as inputs. Therefore, the gain is changed easily by a distribution pressure deviation, an outlet flow, and an outlet flow rate in accordance with a demanded flow and a size of a change of a demanded flow, so that the pressure can be securely be controlled to be constant.

In addition, an outlet flow rate can be obtained with high accuracy by a self-regression calculation using present and past outlet flow measurement values, so that more stable constant pressure control can be realized.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A distribution pressure controlling apparatus comprising:

distributing means for supplying water in a distribution reservoir to a distributing pipe network;

outlet pressure detecting means for detecting an outlet pressure of water discharged from the distributing means;

outlet flow detecting means for detecting an outlet flow of water discharged from the distributing means;

distribution pressure detecting means for detecting a distribution pressure of the distributing pipe network;

a fuzzy table for storing a relationship between a deviation between a distribution pressure set by a user and the distribution pressure detected by the distribution pressure detecting means, the outlet flow detected by the outlet flow detecting means, and an outlet pressure target value correction amount for correcting an outlet pressure of water discharged from the distributing means;

outputting means for obtaining the outlet pressure target value correction amount from the fuzzy table, based on the deviation between the distribution pressure set by the user and the distribution pressure detected by the distribution pressure detecting means, and the outlet flow detected by the outlet flow detecting means, for correcting an outlet pressure target value with respect to the distributing means with use of the outlet pressure target value correction amount, and for outputting the outlet pressure target value thus corrected; and controlling means for controlling the distributing means to be equalized to the distribution pressure set by the user, based on the outlet pressure target value outputted by the outputting means and the outlet pressure detected by the outlet pressure detecting means.

2. An apparatus according to claim 1, wherein the distributing means comprises distributing pumps, and the controlling means performs feedback control on a number of operating ones of the distributing pumps and a rotation speed thereof.

3. A distribution pressure controlling apparatus comprising:

distributing means for supplying water in a distribution reservoir to a distributing pipe network;

outlet pressure detecting means for detecting an outlet pressure of water discharged from the distributing means;

outlet flow detecting means for detecting an outlet flow of water discharged from the distributing means;

distribution pressure detecting means for detecting a distribution pressure of the distributing pipe network;

calculating means for calculating a change rate of the outlet flow, based on the outlet flow detected by the outlet flow detecting means;

a fuzzy table for storing a relationship between a deviation between a distribution pressure set by a user and the distribution pressure detected by the distribution pressure detecting means, the change rate of the outlet flow calculated by the calculating means, and an outlet pressure target value correction amount for correcting an outlet pressure of water discharged from the distributing means;

outputting means for obtaining the outlet pressure target value correction amount from the fuzzy table, based on the deviation between the distribution pressure set by the user and the distribution pressure detected by the distribution pressure detecting means, and the change rate of the outlet flow calculated by the calculating means, for correcting an outlet pressure target value with respect to the distributing means with use of the outlet pressure target value correction amount, and for outputting the outlet pressure target value thus corrected; and controlling means for controlling the distributing means to be equalized to the distribution pressure set by the user, based on the outlet pressure target value outputted by the outputting means and the outlet pressure detected by the outlet pressure detecting means.

4. An apparatus according to claim 3, wherein the distributing means comprises distributing pumps, and the controlling means performs feedback control on a number of operating ones of the distributing pumps and a rotation speed thereof.

5. An apparatus according to claim 3, wherein the change rate of the outlet flow calculated by the calculating means is calculated by a self-regression calculation based on present and past outlet flows detected by the outlet flow detecting means.

6. A distribution pressure controlling apparatus comprising:

distributing means for supplying water in a distribution reservoir to a distributing pipe network;

outlet pressure detecting means for detecting an outlet pressure of water discharged from the distributing means;

outlet flow detecting means for detecting an outlet flow of water discharged from the distributing means;

distribution pressure detecting means for detecting a distribution pressure of the distributing pipe network;

calculating means for calculating a change rate of the outlet flow, based on the outlet flow detected by the outlet flow detecting means;

a first fuzzy table for storing a relationship between a deviation between a distribution pressure set by a user and the distribution pressure detected by the distribution pressure detecting means, the outlet flow detected by the outlet flow detecting means, and a first outlet pressure target value correction amount for correcting an outlet pressure of water discharged from the distributing means;

a second fuzzy table for storing a relationship between the deviation between the distribution pressure set by the user and the distribution pressure detected by the distribution pressure detecting means, the change rate of the outlet flow calculated by the calculating means, and a second outlet pressure target value correction amount for correcting an outlet pressure of water discharged from the distributing means;

obtaining means for obtaining the first outlet pressure target value correction amount from the first fuzzy table, based on the deviation between the distribution pressure set by the user and the distribution pressure detected by the distribution pressure detecting means and the change rate of the outlet flow calculated by the calculating means, and for obtaining the outlet pressure target value correction amount from the fuzzy table, based on the deviation between the distribution pressure set by the user and the distribution pressure detected by the distribution pressure detecting means, and the change rate of the outlet flow calculated by the calculating means;

adding means for adding the first and second outlet pressure target value correction amounts obtained by the obtaining means, to each other, to obtain a third outlet pressure target value correction amount;

outputting means for correcting an outlet pressure target value with respect to the distributing means with use of the third outlet pressure target value correction amount obtained by the adding means, and for outputting the outlet pressure target value thus corrected; and controlling means for controlling the distributing means to be equalized to the distribution pressure set by the user, based on the outlet pressure target value outputted by the outputting means and the outlet pressure detected by the outlet pressure detecting means.

7. An apparatus according to claim 6, wherein the distributing means comprises distributing pumps, and the controlling means performs feedback control on a number of operating ones of the distributing pumps and a rotation speed thereof.

8. An apparatus according to claim 6, wherein the change rate of the outlet flow calculated by the calculating means is calculated by a self-regression calculation based on present and past outlet flows detected by the outlet flow detecting means.

* * * * *